Nov. 27, 1923.
O. A. KIELSMEIER
1,475,398
CHEESE MAKING APPARATUS
Filed March 1, 1922
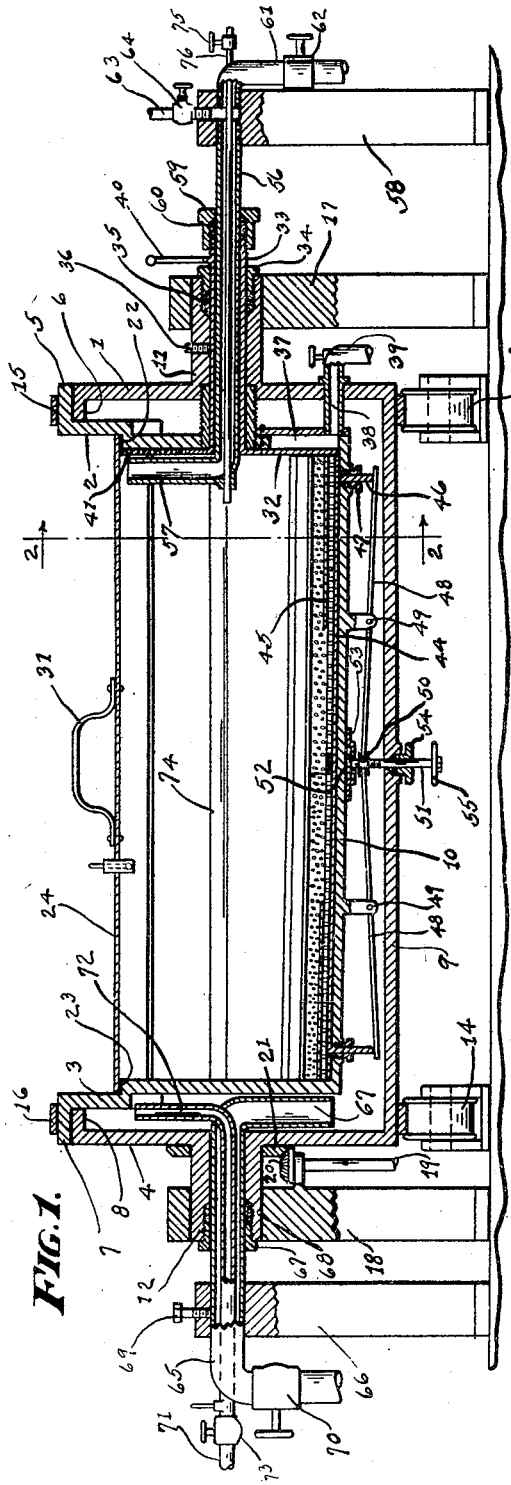
INVENTOR
Otto A. Kielsmeier
BY
Erwin Wheeler & Woodard
ATTORNEYS.

Patented Nov. 27, 1923.

1,475,398

UNITED STATES PATENT OFFICE.

OTTO A. KIELSMEIER, OF MANITOWOC, WISCONSIN.

CHEESE-MAKING APPARATUS.

Application filed March 1, 1922. Serial No. 540,132.

*To whom it may concern:*

Be it known that I, OTTO A. KIELSMEIER, a citizen of the United States, residing at Manitowoc, county of Manitowoc, and State of Wisconsin, have invented new and useful Improvements in Cheese-Making Apparatus, of which the following is a specification.

This invention relates to a cheese making apparatus.

Objects of this invention are to provide a cheese making machine in which the temperature, pressure, acidity, and moisture may be accurately controlled; and to provide a cheese making machine which permits washing of the material, whenever desirable; to provide a machine in which the whey may be readily withdrawn; and to provide a machine which will keep the particles of material separate and thereby insure proper treatment for all portions of the material.

Further objects are to provide a cheese making machine which is compact; which may be readily operated, which is simple in design, and which may be cheaply made.

An embodiment of the invention is shown in the accompanying drawings, in which:—

Fig. 1 is a side elevation of a cheese making machine with the major part in section.

Fig. 2 is a transverse sectional view on the line 2—2 of Fig. 1, showing the parts in the position they occupy in Fig. 1.

Fig. 3 is a view similar to Fig. 2, showing the parts in a different position.

Fig. 4 is a fragmentary elevation, partly in section, corresponding to Fig. 1, but showing the parts in the position they occupy as shown in Fig. 3.

The machine comprises a drum-like member having circular hollow ends, preferably composed of the members 1 and 2, and 3 and 4—such a construction providing for the overlapping of the arcuate flanges 5 and 6, and 7 and 8 of such members. The outer portions 1 and 4 are continued inwardly, so as to provide an integral, bottom drum-like portion 9. The inner members 2 and 3 have an integral bottom portion 10 of cylindrical contour, positioned within the cylindrical or drum-like member 9. These two main pieces form between them a jacket or casing through which a heating fluid may be passed, as hereinafter described. The entire apparatus is supported jointly by trunnion bearings, formed by the projecting hubs 11 and 12 of the end portions 1 and 4, and by rollers 13 and 14, engaging hoops or bands 15 and 16 surrounding the end portions of the apparatus. The hubs 11 and 12 are carried in bearing standards 17 and 18, as illustrated in the drawing. A rotary motion is imparted to the apparatus by any suitable means as, for example, the vertical shaft 19 and bevel gears 20 and 21, as illustrated in the left hand portion of Fig. 1.

The inner members 2 and 3 are provided with arcuate upper shoulders 22 and 23, upon which rests a cylindrical cover 24, such cover being provided with longitudinal flanges 25 and 26 adapted to seat upon the longitudinal shoulders 27 and 28 of the inner member 10. This cover seals the inner drum and may be secured in place by any suitable means as, for example, by means of bolts 29—a suitable gasket 30 (see Fig. 2) being provided throughout the contacting surfaces. This cover may be provided with a manipulating handle 31, if desired. The material to be treated is inserted within the inner drum 10 and thereafter the cover 24 is secured in place.

In order to provide for the draining of liquids contained in the material, or of water used in washing the material, a disk 32 is positioned inside the drum 1 and in intimate contact with the member 2. Such disk, is rigidly connected with a sleeve 33 accurately fitted within the drum 11. The joint between the trunnion 11 and the sleeve 33 is sealed by means of a packing gland 34 and packing gasket 35 in a well-known manner. A set screw 36 may be threaded through the trunnion 11 and engage the sleeve 33, so as to temporarily and positively hold the disk 32 in its position of adjustment, relative to the member 2. The end disk or member 2 is provided with a hollowed-out portion 37, which is preferably segmental in outline as may be seen from Fig. 2. A pipe 38 communicates with this cavity and passes outwardly through the member 1, such pipe being provided with a cut-off valve 39. When it is desired to drain liquid from the material within the inner drum 10 the apparatus is stopped in the position shown in Fig. 1, and the disk 32 rotated by means of a handle 40 secured to the sleeve 33 until the apertured upper portion 41 of the disk registers with the cavity 37, as indicated in Fig. 3. This obviously allows liquid to drain from the material into the cavity 37 through the perforated portion 41 of the disk. However to facilitate this draining operation, a movable screen bottom 42 is provided and is preferably composed of two longitudinal strips of screen with their ends secured between longitudinal clips 43 fastened to the inner surfaces of the inner drum 10. A longitudinal strip 44 is positioned beneath the central portion of the screen 42 and a pair of strap-like members 45 are positioned above the central portion of the screen. These members 45 may be continued completely across the screen lengthwise thereof, or may be stopped short of the entire length of the screen, as illustrated in the drawing. However it is preferable that the members 44 and 45 be secured to the screen. A pair of pins 46 located preferably as illustrated in Fig. 1 at opposite ends and beneath the member 44, are past through packing glands 47 and have their upper ends bearing against the underside of the member 44. A pair of levers 48 are pivoted at 49 to lugs extending downwardly from the bottom portion of the inner cylinder 10. The outer ends of these levers bear respectively upon the bottom ends of the pins 46. The inner ends of the levers are fitted within a groove formed in a nut 50, threadably carried upon a manually rotatable spindle 51, such spindle having an enlarged end 52 seated within an upper bearing member 53 secured to the inner drum. The spindle passes outwardly through a packing gland 54 in the outer drum 9, and it is provided with a hand wheel 55. It will be seen that when the hand wheel 55 is rotated the inner ends of the levers 48 are drawn downwardly and their outer ends are thereby elevated. The pins 46 are consequently pushed upwardly, thereby raising the member 44 and consequently bowing the screen 42 upwardly as illustrated in Fig. 3. In this manner a conduit, or passageway, is provided beneath the material and in communication with the perforated portion 41 of the disk 32 when such disk is moved in position, shown in Fig. 3. It is to be noted that the bottom portion of the inner drum or cylinder slants downwardly toward the right in Fig. 1, thereby facilitating draining.

A pipe 56 passes downwardly through the sleeve 33 and into the inner drum, such pipe being provided with an angular, vertical portion 57 open at its top. This pipe is threaded into a standard 58 and does not rotate. The joint between the pipe 56 and the sleeve 33 is sealed by means of the packing nut 59 and gasket or packing 60. This pipe communicates with an air supply pipe 61 provided with a controlling valve 62, and also communicates with a water pipe 63 provided with a controlling valve 64.

Provision is made for circulating a heating fluid, such as hot water, within the space between the inner and outer drums 10 and 9. To secure this a relatively large outlet pipe 65 is passed inwardly through the trunnion 12, and is provided with a downwardly extending portion 67. The joint between this pipe and the trunnion 12 is sealed by means of a packing gland 67 and suitable packing 68. It is held in place in the supporting standard 66 by means of a set screw 69 and is provided with a control valve 70. The inlet pipe 71 is relatively smaller and is positioned within the outlet pipe 65, and is similarly provided with annular portion 72, such portion, however, extending upwardly through the bend in the pipe 65. It is also provided with a control valve 73 so that any desired control of the circulating tempering medium may be had.

The operation of the device is as follows:

The milk after having become coagulated, as for example, by rennet or pepsin, is placed within the inner drum 10. This coagulated mass may then be cut into relative small particles by means of horizontal knives, operated by the attendant or by any suitable corresponding instrument. After the top is secured in position the apparatus is raised to the desired temperature by means of the hot water within the jacket between the inner and outer drums, such hot water being continually supplied through the pipe 71 and withdrawn through the pipe 65. The drum is then rotated by means of the power shaft 19, and the particles are further broken up and caused to separate from the whey. A horizontal rib 74 located within the inner cylinder 10 materially aids in this process. After rotating for a suitable length of time, the drum is stopped in the position shown in Fig. 1, thereafter the set screw 36 is loosened and the disk 32 is rotated half way around by means of a handle 40 and the sleeve 33. In this position the perforations 41 are positioned opposite the cavity 37. The hand wheel 55 is now rotated to thereby raise the pins 46 upwardly and lift the supporting bar 44. This bar bulges the screen 42 upwardly as indicated in Fig. 3, and allows the whey to separate from the solid material throughout the entire bottom portion of the inner drum. The valve 39 is now opened and the whey is drained from the apparatus, the slanting bottom surface of the inner drum 10 facilitating this operation. It is to be noted that by raising the screen throughout its length a very extensive draining surface of screen is presented, and the whey may drain directly downwardly from any portion of the mass. When this operation has been completed, the valve 39 is closed, the hand wheel 55 rotated in the opposite direction and the screen 42 is again seated against the bottom surface of the inner drum. The handle 40 is now operated to turn the disk 32 back into the position shown in Fig. 1, and the set screw 36 is then screwed down against the sleeve 33; the drum is again rotated while the temperature is held at the desired point by means of the circulating heating fluid. This rotation may be continued for several hours to allow the desired changes to occur in the curds. At any time and preferably continuously during the process, the generated gases may be withdrawn through the pipe 56. During the latter stage of the operation, it may be found desirable to reduce the pressure within the inner drum; this may be conveniently done by means of a vacuum pump connected with the outgoing portion 61 of the pipe 56, and the degree of vacuum within the inner drum accurately controlled by means of the valve 62.

If it is desired to wash the curds, water may be admitted by opening the valve 64 and allowing the water to pass inwardly through the pipe 56; thereafter the drum may be rotated, thereby causing intimate contact to occur between the water and the particles of the curds. This water, of course, may be drained out in the same manner that the whey was drained as previously described. After the material has been sufficiently drained the cover may be removed and salt added to the mass. The drum may again be rotated, after clamping the cover in position, to insure uniform distribution of salt throughout the material.

At certain stages in the operation, it may be desirable to blow air into the drum and allow the vapors to pass outwardly through the pipe 61. This may be easily accomplished by means of the pipe 76, the flow of air being controlled by the valve 75. In addition to this, the same pipe 76 may serve for the admission of steam if it becomes desirable. Steam may be used to sterilize the mass during the final stages of the operation. When steam is used, however, it is contemplated circulating cold water in the outer casing so as to prevent undue softening of the material and to cause such material to retain its original or divided condition.

When the process is completed, the material may be removed from the drum by suitable shovels after the cover has been removed, or the drum may be rotated a half revolution from the position shown in Fig. 1, so as to dump the material into a suitable receptacle. It is then stacked or packed in the cheese containers.

It will be seen that a cheese making apparatus has been provided, in which accurate control of the temperature and of the pressure may be had. It will also be seen that the desired acidity may be accurately controlled by timing the washing and straining operations and by varying the amount of water admitted to the mass.

I claim:

1. A cheese making apparatus comprising an inner and outer drum, means for rotating said drums, means for continuously circulating a tempering fluid within the space between said drums, means for withdrawing gases from said inner drum while said drums are in rotation, means within the drum for draining whey from solid material, and means for draining the whey from said inner drum.

2. A cheese making apparatus comprising a large drum, a relatively smaller drum positioned therein and spaced therefrom, a removable cap for providing entrance to said inner drum, trunnions for revolubly supporting said drums, a series of pipes passing through said trunnions and providing means for circulating a tempering fluid between said drums, a relatively stationary pipe passing through one of said trunnions and into the inner drum, a valve associated with said last mentioned pipe for controlling the pressure within said inner drum, and means for supplying water to said inner drum at any desired stage in the operation.

3. A cheese making apparatus comprising substantially concentric spaced drums, means for circulating a heating fluid between said drums, mechanism for rotating and supporting said drums, a pipe leading into the inner drum and provided with a cut-off valve to control the pressure within said inner drum, and a second pipe leading from the bottom portion of said inner drum through said outer drum and adapted to allow the whey to be drained from said inner drum.

4. A cheese making apparatus comprising a revolubly mounted drum, means for maintaining said drum at any desired temperature, a screen located adjacent a portion of the periphery of said drum, means for elevating said screen to provide a passageway for whey, and means for withdrawing said whey from said passageway.

5. A cheese making machine comprising inner and outer drums, mechanism for rotating said drums, a series of pipes for the circulation of a tempering fluid between said drums, one end of the inner drum having a cavity formed therein, a pipe leading from said cavity through said outer drum and a disk having a perforated portion and an imperforate portion positioned adjacent the said end of the inner drum and adapted to be rotated to alternately bring the imperforate and the perforated portions opposite said cavity, to thereby permit draining of liquid from the inner drum.

6. A cheese making apparatus comprising substantially concentric spaced drums, means for circulating a tempering fluid within the space between said drums, the inner of said drums having one end provided with a cavity, a pipe communicating with said cavity and extending outwardly through said drum, a disk revolubly mounted adjacent said end and having perforate and imperforate portions and adapted to be rotated to bring either of said portions opposite said cavity, a screen positioned adjacent a portion of the inner periphery of said inner drum, and means extending outwardly through said outer drum for elevating said screen.

OTTO A. KIELSMEIER.